United States Patent [19]

Canniff et al.

[11] Patent Number: 4,644,568

[45] Date of Patent: Feb. 17, 1987

[54] TIMING SIGNAL DISTRIBUTION ARRANGEMENT

[75] Inventors: Ronald J. Canniff, Naperville; Mike A. Derrenberger, Aurora, both of Ill.

[73] Assignee: AT&T Bell Laboratories, Murray Hill, N.J.

[21] Appl. No.: 717,282

[22] Filed: Mar. 28, 1985

[51] Int. Cl.⁴ .......................................... H03K 17/00
[52] U.S. Cl. ................................. 375/108; 328/154
[58] Field of Search ............... 370/100, 108, 63, 58, 370/60, 68; 375/118, 108, 100; 328/61, 63, 74, 104, 112, 154

[56] References Cited

U.S. PATENT DOCUMENTS

| 3,479,603 | 11/1969 | Overstreet, Jr. | 328/61 |
| 3,539,933 | 11/1970 | White | 328/154 |
| 3,564,431 | 2/1971 | Skrydstrup | 328/154 |
| 3,974,333 | 8/1976 | May, Jr. et al. | 375/108 |
| 4,185,245 | 1/1980 | Fellinger et al. | 328/103 |
| 4,254,492 | 3/1981 | McDermott, III | 375/108 |
| 4,348,762 | 9/1982 | Shiun et al. | 375/118 |
| 4,480,198 | 10/1984 | Gass | 307/269 |
| 4,511,859 | 4/1985 | Dombrowski | 331/11 |

FOREIGN PATENT DOCUMENTS 0105017  6/1982  Japan ..................... 375/108

*Primary Examiner*—Robert L. Griffin
*Assistant Examiner*—M. Huseman
*Attorney, Agent, or Firm*—Kenneth H. Samples

[57] ABSTRACT

An arrangement for selectively connecting a first or a second frequency synchronous timing signal to an outgoing conductor is disclosed. When a transition from the first to the second timing signal occurs, the first timing signal is inhibited from being transmitting on the outgoing conductor and the logical AND of the second timing signal and a delayed version of the second timing signal is transmitted on the outgoing conductor for approximately one period of the timing signals. Thereafter, the second clock signal is transmitted on the outgoing conductor. Arrangements are also disclosed for switching from the second timing signal to the first timing signal.

10 Claims, 4 Drawing Figures

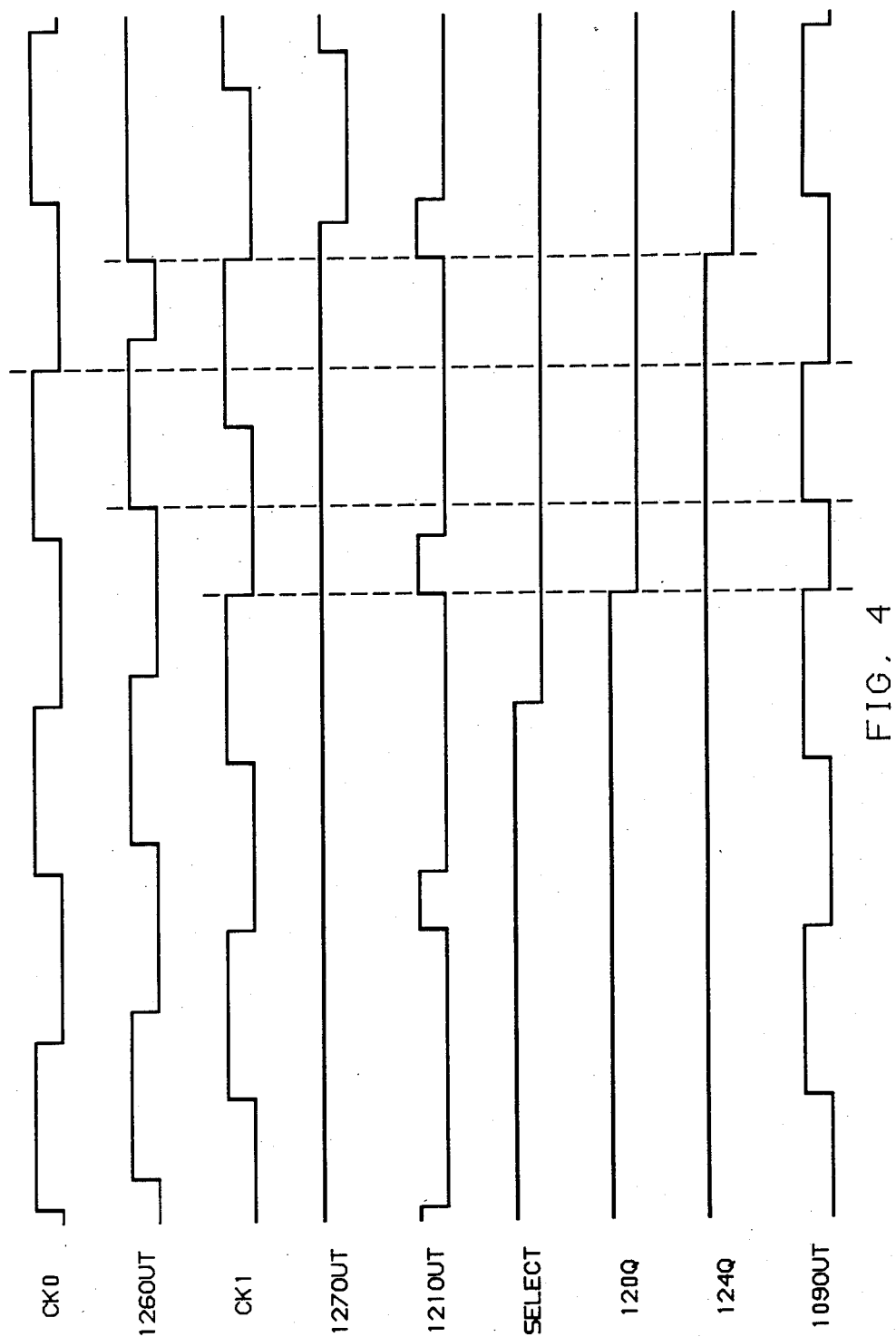

TIMING SIGNAL DISTRIBUTION ARRANGEMENT

TECHNICAL FIELD

This invention relates to timing signal distribution and more particularly to arrangements for controlling distribution of duplicated timing signals.

BACKGROUND OF THE INVENTION

Arrangements such as telecommunication switching systems operate relatively synchronously by reacting to the timing signals from a common source. For system reliability, the timing signals are often duplicated and transmitted to utilization circuitry using different paths. This results in two frequency-synchronous signals, one of which may be selected by the utilization device. Since the two signals travel different paths and are subject to different delays, they may exhibit a phase offset. These phase differences are not a problem for long term operation, but such differences can create problems when switching from one timing signal to the other. For example, a large phase difference may cause the first pulse occurring after a timing signal switch to be too short to be responded to by the utilization device. This missed clock pulse would result in a non-synchronous utilization device. Prior arrangements, such as that disclosed in L. C. Dombrowski U.S. Pat. No. 4,511,859 have solved the problem by attempting to phase align the timing signals at the utilization circuitry. While these arrangements can provide the necessary protection, they add greatly to the complexity and cost of the utilization devices. This becomes an extreme hardship when the number of utilization devices, each requiring corrective circuitry, is large. The present invention is a simple and efficient arrangement for switching between timing signals which may exhibit phase offset while avoiding pulses which are too short to be utilized.

SUMMARY OF THE INVENTION

The aforementioned problem is solved and a technical advance is achieved in accordance with the principles of the invention in an arrangement wherein the duration of the first pulse occurring after a timing signal switch is lengthened to an amount in excess of the minimum usable pulse length.

An arrangement in accordance with the present invention includes a first and second alternating logic level timing signals which are frequency synchronous and a means for selecting the first of these timing signals as an outgoing timing signal. Also included is an arrangement for generating a delayed second timing signal, an arrngement for generating a selection signal defining the second timing signal, and an arrangement responsive to the selection signal for changing the logic level of the outgoing timing signal when the delayed timing signal changes for one logic level change and for alternating the logic level of the outgoing timing signal in accordance with the second timing signal thereafter.

BRIEF DESCRIPTION OF THE DRAWING

A more complete understanding of the present invention may be obtained from consideration of the following description when read in conjunction with the drawing in which:

FIG. 2 and FIG. 4 are representations of the timing relationships of signals within the system.

DETAILED DESCRIPTION

Figure 1:
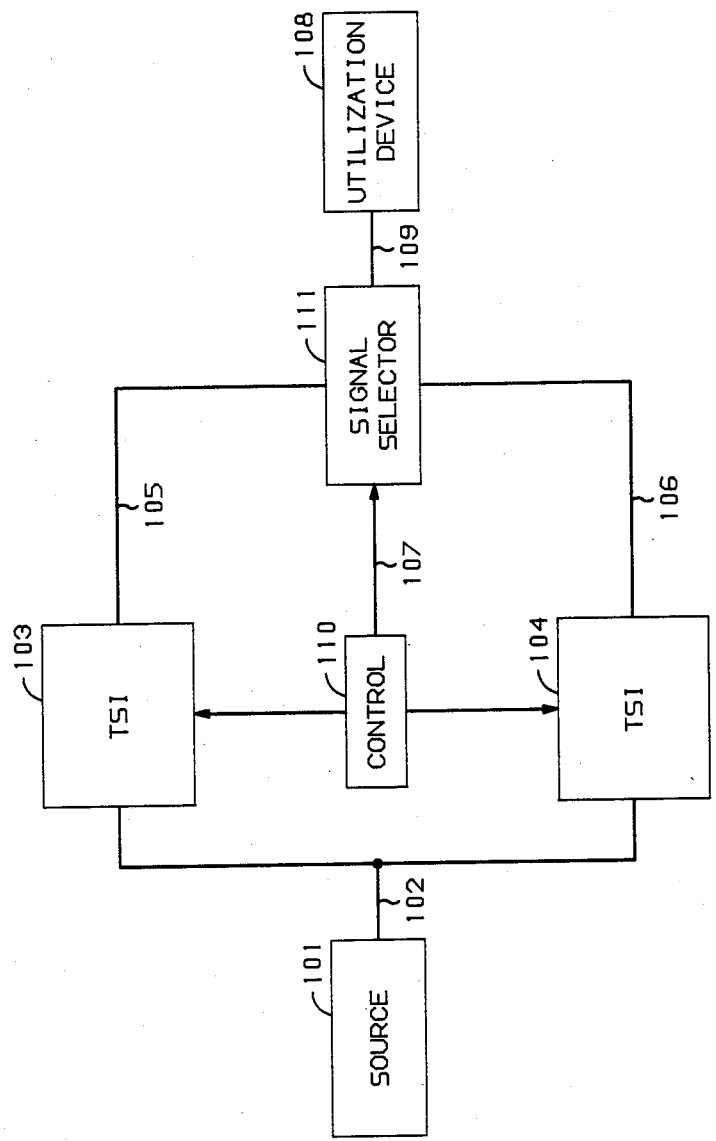
FIG. 1 is a block diagram of a system for utilizing the present invention.

FIG. 1 is a block diagram of an arrangement for utilizing the present invention. The arrangement of FIG. 1 includes a source of timing signals 101. In the present example, the timing signals comprise a recurring sequence of timing pulses at a rate of 4.096 million pulses per second with a fifty percent duty cycle. A 4.096 MHz, fifty percent duty cycle signal consists of approximately 122 nanosecond logical 1's separated by approximately 122 nanosecond logical 0's. The timing signals from source 101 are transmitted via conductor 102 to two time-slot interchange units 103 and 104, which operate under the control of a control arrangement 110. Time-slot interchangers 103 and 104 are used in conjunction with other components (not shown) to perform time division switching. Only the use of time-slot interchangers to distribute timing signals is discussed herein. The other functions of time-slot interchangers and their relationship to other components to provide time division switching is disclosed, for example, in H. J. Beuscher et. al., U.S. Pat. No. 4,322,843. Each of the time-slot interchange units 103 and 104 transmits the timing signals to a signal selection circuit 111 via a respective one of conductors 105 and 106. Signal selection circuit 111 is connected to a utilization device 108 via a conductor 109. The timing signals applied to selection circuit 111 are frequency synchronous since they are derived from a common source. However, due to different transmission path lengths and different delays through the time-slot interchangers 103 and 104, the timing signals are likely phase shifted when they arrive at selection circuit 111.

The amount of phase difference in the timing signals cannot be precisely predicted for every situation. However, by measuring or by calculation based on known ranges of circuit delay values, the maximum phase delay can be predicted. In the present example, a delay of plus or minus 40 nanoseconds can occur in both transmission paths. Accordingly, the timing signals arriving at selection circuit 111 can be out of phase by as much as 80 nanoseconds.

Figure 2:
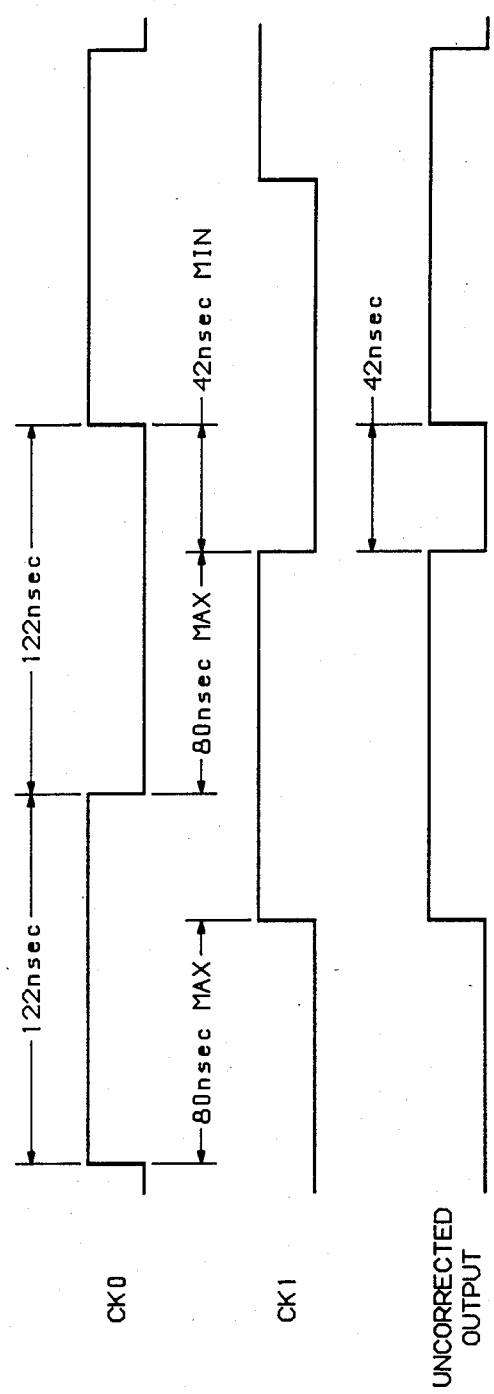

Selection circuit 111 selects one of the timing signals to be sent to utilization device 108. This signal is called the active timing signal. The particular signal which is to be used is determined by the control unit 110 and controlled by signals applied to conductor 107. The active timing signal should be changed when both timing signals have the same value to avoid missing a timing signal transition. Further, it has been found desirable to make the transition when both timing signals are in the low state to avoid momentary unwanted values which could adversely affect circuit operation. FIG. 2 represents the timing signal on conductor 105 (CK0) and the timing signal on conductor 106 (CK1) as they arrive at signal selector 111 under worst case conditions. That is, timing signal CK1 lags CK0 by the maximum of 80 nanoseconds. If a timing signal transition from CK1 to CK0 were to occur given the above constraints, the logical low level signal of only 42 nanoseconds would be generated. This is shown as the line "uncorrected output" in FIG. 2.

Figure 3:
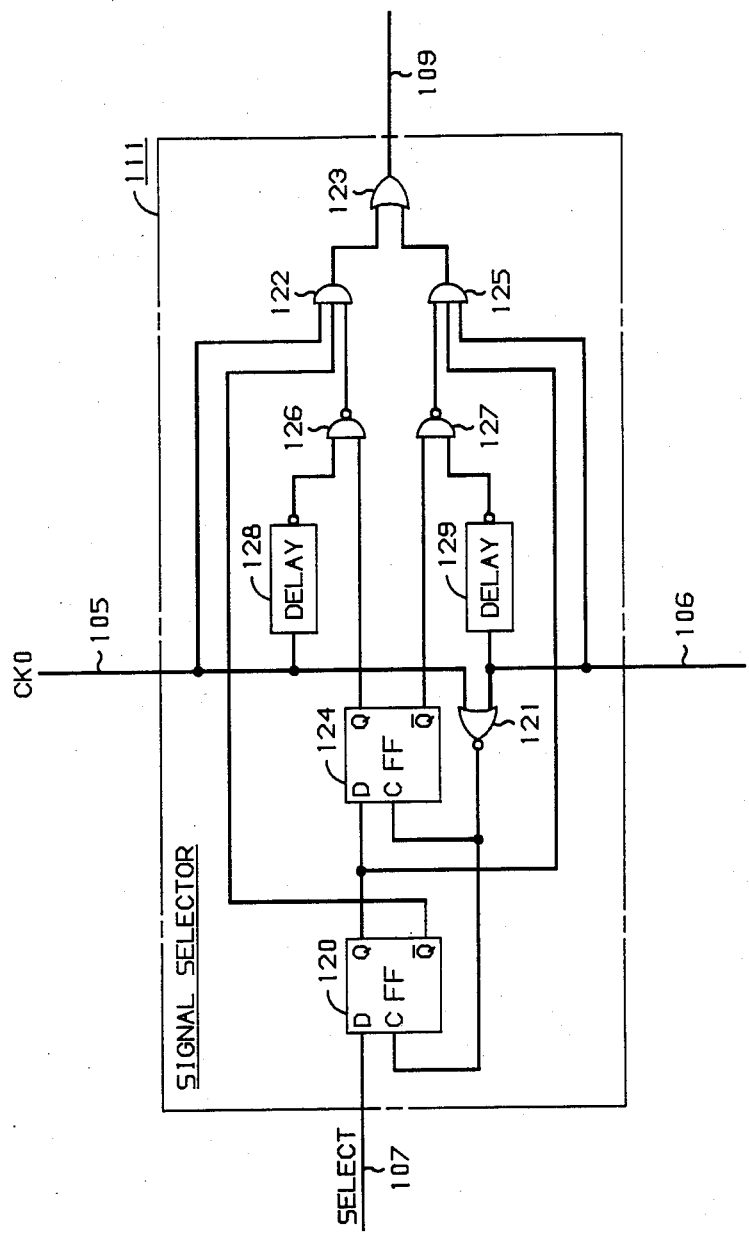
FIG. 3 is a circuit diagram of a timing signal selection arrangement.

Most utilization devices have a certain minimum time for which a logic level must be maintained for the device to predictably respond to it. In the present example, utilization device 108 can predictably respond to logic levels which are 50 nanoseconds or longer. Accordingly, a switch of timing signals as shown in FIG. 2 could cause erroneous operation of the utilization device 108 since the first logical 0 after the timing signal transition lasts only 42 nanoseconds. FIG. 3 is a circuit arrangement embodying the present invention which is used to prevent such difficulties. It should be mentioned that the selection circuit 111 is capable of responding to logic levels which are less than the 42 nanoseond minimum length signals. Since selection circuit 111 is small and relatively simple, care can be taken in accordance with principles well known in the art to assure that this circuit can respond to logic levels which are less than the 42 nanosecond duration. Generally stated, the embodiment of FIG. 3 delays the incoming timing signal to be switched to (CK0) by an amount which when added to the duration of the shortest possible logic level at the transition, yields a duration in excess of the minimum duration permitted. The timing signal going to the utilization device has a falling edge when both original timing signals CK0 and CK1 are low and a first rising edge when the delayed timing singal has a rising edge. All subsequent logic level changes occur when timing signal CK0 exhibits logic level changes. In the present example, the minimum delay is 8 nanoseconds since adding 8 nanoseconds to the minimum pulse duration of 42 nanoseconds, yields an acceptable 50 nanosecond logic level. A maximum amount of delay also exists in the present embodiment. Lengthening a logic level duration shortens the duration of the immediately succeeding logic level. If the logic level is lengthened too much, the succeeding logic level may be made too short to be responded to. In the present embodiment, the theoretical maximum delay is 72 nanoseconds. A delay of approximately 22 nanoseconds is provided in the present example.

The first portion of the following discussion relates to the circuit operation of FIG. 3 in the steady state, while the second portion relates to transitions between timing signals CK0 and CK1. Timing diagrams representing the operation of the exemplary timing signal selector of FIG. 3 are shown in FIG. 4. In FIG. 4 the representations CK0, CK1, and select are labeled as such. The remaining representations are labeled by showing the device number and output designation as shown in FIG. 3. For example, 120Q represents the Q output of device 120.

Signal selector 111 includes a D-type flip-flop 120, the D-input of which is connected to the selection signal on conductor 107. For the purposes of the present example, conductor 107 conveys a logical 1 indicating that clock signal CK1 is to control the output signal on conductor 109. The timing signals CK0 and CK1 are connected as inputs to a NOR gate 121, the output of which is connected to the clock input of flip-flop 120. Accordingly, whenever both signals CK0 and CK1 are a logical 0, a logical 1 is applied to the clock input of flip-flop 120 and that flip-flop stores the value at its D-input. The signal at the output of NOR gate 121 (121out) is referred to as the no-pulse or low logic level signal. Since the signal on conductor 107 is a logical 1, the Q output of flip-flop 120 is a logical 1, and the $\overline{Q}$ output is a logical 0 in response to the no-pulse signal (121out). The arrangement also includes an AND gate 122, the output of which is connected to output conductor 109 via an OR gate 123. One input of AND gate 122 is connected to the $\overline{Q}$ output of flip-flop 120. The logical 0 and the $\overline{Q}$ output of flip-flop 120 inhibits AND gate 122 from conveying any signals to OR gate 123. The Q output of flip-flop 120 is connected to the D input of a D-type flip-flop 124, and to an input of an AND gate 125. The output of AND gate 125 is connected to outgoing conductor 109 via OR gate 123. The clock input of flip-flop 124 is connected to the output of NOR gate 121. Thus, whenever both timing signals CK0 and CK1 are a logical 0, a logical 1 is applied to the clock input of flip-flop 124 which then stores the Q output of flip-flop 120.

In accordance with the present example, the Q output of flip-flop 120 is a logical 1 causing the Q output of flip-flop 124 to also be a logical 1. The logical 1 Q output of flip-flop 124 is connected as an input to a NAND gate 126 and the logical 0 $\overline{Q}$ output of flip-flop 124 is applied as an input to a NAND gate 127. Due to the logical 0 input to NAND gate 127, its output signal, which is coupled to AND gate 125, is a logical 1. As described, AND gate 125 receives logical 1 inputs on two of its three inputs. The third input is connected to timing signal CK1. Accordingly, timing signal CK1 is transmitted to outgoing conductor 109 via OR gate 123. It will be remembered that the $\overline{Q}$ output of flip-flop 120 inhibits AND gate 122 from transmitting any signals to OR gate 123. It should be mentioned however, that the other two inputs of AND gate 122 are connected to the timing signal CK0 and to the output of NAND gate 126.

Timing signals CK0 and CK1 are delayed by respective delay units 128 and 129, the outputs of which are respectively connected as inputs to NAND gates 126 and 127. The type of delay element utilized is not important to the present embodiment. The delay element could, for example, comprise a series connection of logic gates. However, due to the logic circuits used in the present embodiment, the output of each delay unit should be the inverse of its input. This is denoted in FIG. 3 by including a negation circle at the output of delay devices 128 and 129. The amount of delay to be provided should be at least an amount, which when added to the duration of the shortest logic level at transition, will yield a duration equal to or greater than the minimum allowable logic level time. With our present example of a minimum duration of 50 nanoseconds for a logic level and a possible 42 nanosecond logic level during transition, at least 8 nanoseconds of delay should be added. The preceding described that while the selection signal is a logical 1 in the steady state, the output conductor 109 will convey timing signal CK1. A similar examination will show that the output conductor 109 will convey timing signal CK0 in the steady state when a logical 0 selection signal is applied to conductor 107.

The following is a description of the operation of selection circuit 111 when changing from the selection of timing signal CK1 to the selection of timing signal CK0. The operation begins when control unit 110 changes the selection signal on conductor 107 from a logical 1 to a logical 0. When both timing signals CK0 and CK1 are next contemporaneously a logical 0 (121out), the Q and $\overline{Q}$ outputs of flip-flop 120 (see 120Q) change state applying a logical 0 to AND gate 125 and a logical 1 to AND gate 122. The logical 0 applied to AND gate 125 inhibits any signal at its other inputs from changing the output signal on outgoing conductor 109. Thus the timing signal CK1 is inhibited from controlling the signal on output conductor 109. The logical 1 on the $\overline{Q}$ output of flip-flop 120 enables AND gate 122 to transmit the logical AND of the timing signals CK0 and the delayed CK0 timing signal (126out) to outgoing conductor 109. As shown in FIG. 4, a signal on outgoing conductor 109 becomes a logical 0 at the rising edge of the no-pulse signal. In the terms of our example, timing signal CK0 becomes a logical 1 approximately 42 nanoseconds after the output signal on conductor 109 became a logical 0. Thus, the timing signal CK0 and the $\overline{Q}$ output of flip-flop 120 are applying logical 1's to the inputs of AND gate 122. The output of AND gate 122 remains a logical 0, however, since the delayed CK0 timing signal is still a logical 0. The delayed CK0 timing signal (126out) becomes a logical 1 at approximately the delay interval after CK0 became a logical 1. When the delayed CK0 timing signal (126out) becomes a logical 1, a logical 1 is transmitted on conductor 109 via OR gate 123. Thus, it can be seen that at the transition, the falling edge of the output pulse on conductor 109 is controlled by the falling edge of timing signal CK1, while the rising edge of the next pulse is controlled by the rising edge of the delayed timing signal CK0 (126out). This effectively extends the duration of the outgoing low level signal to a length which can be responded to by the utilization device 108. When timing signal CK0 next becomes a logical 0, AND gate 122 applies a logical 0 to output conductor 109.

At the next occurrence of contemporaneous logical 0's by timing signals CK0 and CK1, the Q and $\overline{Q}$ outputs (see 124Q) become a logical 0 and logical 1, respectively. A logical 0 input to NAND gate 126 from 124Q causes a steady state logical 1 signal to be applied to AND gate 122. This enables AND gate 122 to transmit the timing signal CK0 on outgoing conductor 109. Also, the logical 0 applied to NAND gate 127 enables that gate to apply the delayed clock signal CK1 (127out) to AND gate 125. Thus, the steady state has again been achieved with a lengthened low level signal at the transition and timing signal CK0 supplying the remaining output signals on conductor 109.

The present embodiment operates in a substantially similar manner when timing signal CK1 replaces timing signal CK0. When the first no-pulse signal occurs after the selection signal on conductor 107 becomes a logical 1, AND gate 122 is inhibited from transmitting timing signal CK0 on conductor 109. Further, AND gate 125 is enabled to transmit the logical AND of timing signal CK1 and the delayed CK1 timing signal on conductor 109. All subsequent logic level changes on conductor 109 are controlled by CK1.

The preceding preferred embodiment responds at times to a no-pulse signal which is generated when both timing pulses are a logical 0. It should be noted, however, that arrangements embodying the present invention can be designed which respond similarly to an equal logic level signal which is generated when both timing signals are exhibiting the same one of the two possible logic levels. For example, the equal logic level signal could be generated when both timing signals are exhibiting logical 0's or, alternatively, the equal logic level signals could be generated when both are exhibiting logical 1's with minor circuit modifications.

It is to be understood that the above-described embodiment is merely illustrative of the principles of the invention and that other arrangements may be devised by those skilled in the art without departing from the spirit and scope of the invention.

What is claimed is:

1. In combination,
a source of first and second timing signals, said timing signals comprising alternating logic levels, wherein said first and said second timing signals are frequency synchronous;
means for generating a first selection signal defining said first timing signal;
means responsive to said first selection signal and said first timing signal for alternating the logic level of an outgoing timing signal;
means for generating a delayed timing signal by delaying said second timing signal;
means for changing said first selection signal to a second selection signal defining said second timing signal; and
means responsive to said second selection signal for changing the logic level of said outgoing timing signal when the delayed timing signal changes, for one logic level change.

2. The combination in accordance with claim 1 further comprising:
means for alternating the logic level of said outgoing timing signal in accordance with said second timing signal after said one logic level change.

3. In combination,
a source of first and second timing signals, said timing signals comprising alternating logic levels, wherein said first and said second timing signals are frequency synchronous;
means for generating a first selection signal defining said first timing signal;
means responsive to said first selection signal and said first timing signal for alternating the logic level of an outgoing timing signal;
means for generating a delayed timing signal by delaying said second timing signal;
means for generating an equal logic level signal when both said first and said second timing signals exhibit a predetermined one of said alternating logic levels;
means for changing said first selection signal to a second selection signal defining said second timing signal; and
means for changing the logic level of said outgoing timing signal when the delayed timing signal changes, for one logic level change after the contemporaneous occurrence of said equal logic level signal and said second selection signal.

4. The combination in accordance with claim 3 further comprising:
means for alternating the logic level of said outgoing timing signal in accordance with said second timing signal after said one logic level change.

5. A timing signal selection circuit for selecting one of two alternating logic level timing signals to be transmitted on an outgoing conduction path, said timing signals being frequency synchronous and wherein no logic level shoudl exist for less than a minimum time duration on said outgoing conduction path comprising:
a source of first and second timing signals;
means for generating a first selection signal defining said first timing signal;
means responsive to said first selection signal for transmitting said first timing signal on said outgoing conduction path;
means for generating an equal logic level signal when both said first and said second timing signals are exhibiting a predetermined one of said alternating logic levels;

means for generating a delayed timing signal by delaying said second timing signal, wherein the amount of delay is equal to or greater than the difference between said minimum time duration and the duration of said equal logic level signals;

means for changing said first selection signal to a second selection signal defining said second timing signal; and means for changing the logic level transmitted on said outgoing conduction path when said delayed timing signal changes for one logic level change after the occurrence of said equal logic level signal and said second selection signal and for altering the logic levels transmitted on said outgoing conduction path in accordance with said second timing signal thereafter.

6. In combination a source of first and second timing signals comprising recurring sequences of alternating logic levels, said timing signals being frequency synchronous;

means for generating a first selection signal defining said first timing signal;

means responsive to said first selection signal for gating said first timing signal to an outgoing conduction path;

means responsive to said first and said second timing signals for generating a no-pulse signal when both timing signals are exhibiting a low logic level;

means for generating a delayed second timing signal by delaying said second timing signal;

means for changing said first selection signal to a second selection signal defining said second timing signal; and means responsive to said second selection signal and the first no-pulse signal generated after the change from said first to said second selection signals for inhibiting the gating of said first timing signal to said outgoing conduction path and for gating the logical AND of said second timing signal and said delayed second timing signal to said outgoing conduction path.

7. The combination in accordance with claim 6 further comprising:

means responsive to the second no-pulse signal after the change from said first to said second selection signals for inhibiting the gating of the logical AND of said delayed second timing signal and said second timing signal to said outgoing conduction path and for gating said second timing signal to said outgoing conduction path.

8. The combination in accordance with claim 7 further comprising:

means for generating a delayed first timing signal by delaying said first timing signal;

means for changing from said second to said first selection signal;

means responsive to said first selection signal and the first no-pulse signal generated after the change from said second to said first selection signal for inhibiting the gating of said second timing signal to said outgoing conduction path and for gating the logical AND of said first timing signal and said delayed first timing signal to said outgoing conduction path.

9. The combination in accordance with claim 8 further comprising:

means responsive to the second no-pulse signal after the change from said second to said first selection signal for inhibiting the gating of the logical AND of said delayed first timing signal and said first timing signal to said outgoing conduction path and for gating said first timing signal to said outgoing conduction path.

10. The combination in accordance with claim 6 wherein the duration of a logic level must be equal to or greater than a predetermined minimum time duration before transmission on said outgoing conduction path, and wherein said delay means comprises means for generating said delayed second timing signal by delaying said second timing signal by an amount equal to or greater than the difference between said minimum time duration and the duration of said no-pulse signals.

* * * * *